United States Patent [19]

Settineri et al.

[11] 4,438,242
[45] Mar. 20, 1984

[54] RETARDATION OF POLYMER BUILDUP IN MONOVINYL AROMATIC SUSPENSION POLYMERIZATION USEING SULFUR TRIOXIDE AS REACTOR COATING

[75] Inventors: William J. Settineri; John M. Hensler, both of Midland, Mich.

[73] Assignee: The Dow Chemical Company, Midland, Mich.

[21] Appl. No.: 366,264

[22] Filed: Apr. 7, 1982

[51] Int. Cl.$^3$ .............................. C08J 9/26; C08J 9/28
[52] U.S. Cl. .................................................... 526/62
[58] Field of Search ......................................... 526/62

[56] References Cited

U.S. PATENT DOCUMENTS

| | | | |
|---|---|---|---|
| 2,837,506 | 6/1958 | Myers et al. | 526/62 |
| 4,105,841 | 8/1978 | Settiner et al. | 526/62 |
| 4,267,291 | 5/1981 | Jones et al. | 526/62 |

FOREIGN PATENT DOCUMENTS

| | | | |
|---|---|---|---|
| 5260885 | 11/1975 | Japan | 526/62 |
| 52-60884 | 5/1977 | Japan | 526/62 |
| 54-07490 | 1/1979 | Japan | 526/62 |

OTHER PUBLICATIONS

C. A. vol. 80, Entry 112493w, Duffan et al.

Primary Examiner—Joseph L. Schofer
Assistant Examiner—Peter F. Kulkosky

[57] ABSTRACT

In the suspension polymerization of monovinyl aromatic polymers, detrimental polymer buildup on the internal surfaces of the reactor is reduced by contacting the internal surfaces of the reactor with sulfur trioxide. This means of retarding polymer buildup is particularly adaptable to suspension polymerization of lightly cross-linked styrene-divinyl benzene copolymer beads which may also contain acrylonitrile.

7 Claims, No Drawings

RETARDATION OF POLYMER BUILDUP IN MONOVINYL AROMATIC SUSPENSION POLYMERIZATION USEING SULFUR TRIOXIDE AS REACTOR COATING

BACKGROUND OF THE INVENTION

In the suspension polymerization of monovinyl aromatic homopolymers, e.g., styrene, and copolymers such as lightly crosslinked monovinyl aromatic-polyvinyl aromatic copolymer particles or beads, e.g., styrene-divinyl benzene beads, there is a significant problem of polymer buildup on the internal surfaces of the polymerization reactor. The polymer buildup eventually fouls the reactor sufficiently to require the reactor to be shut down and the polymer removed from the internal surfaces of the reactor by mechanical means. The cost of such removal and loss in production is significant.

It is desirable, therefore, to have a method which limits or retards the polymer buildup in the suspension polymerization process of these monovinyl aromatic polymer particles/beads.

SUMMARY OF THE INVENTION

The present invention is based upon the discovery that polymer buildup on the internal surfaces of a monovinyl aromatic polymer and copolymer suspension polymerization reactor is retarded by contacting the internal surfaces of the reactor with sulfur trioxide, preferably in the gaseous state. The sulfur trioxide is introduced in an amount sufficient to provide at least about 0.01 grams of sulfur trioxide per gallon of reactor volume. Preferably, the internal surfaces of the reactor are rinsed or flushed with water following contact with the sulfur trioxide. Most preferably, the water rinse includes a neutralizing agent, such as sodium carbonate.

Subsequent suspension polymerization of the monovinyl aromatic polymers in the reactor so treated with sulfur trioxide is carried out with significantly reduced amounts of polymer buildup on the internal surfaces of the reactor. Moreover, when buildup does eventually occur, the polymer is easier to remove from the reactor surfaces.

DETAILED DESCRIPTION OF THE INVENTION

The present invention is particularly adapted to the suspension polymerization of monovinyl aromatic homopolymers, e.g., polystyrene and copolymers of a predominant amount of one or more monovinyl aromatic compounds, e.g., styrene, and from about 0.01 to 0.5 percent by weight of a polyvinyl aromatic compound, e.g., divinyl benzene. Such polymers and the suspension polymerization method of manufacture are well known in the art. The lightly crosslinked monovinyl aromatic-polyvinyl aromatic copolymers are particularly described in U.S. Pat. No. 2,848,428, the teachings of which are herein incorporated by reference.

These lightly crosslinked copolymers can also contain other comonomer constituents such as acrylonitrile. U.S. Pat. No. 3,878,133 discloses copolymers of styrene and acrylonitrile also containing minor amounts of divinyl benzene as a crosslinking agent. The teachings of U.S. Pat. No. 3,878,133 are hereby incorporated by reference.

In carrying out the present invention, the interior surfaces of the polymerization reactor are preferably dried prior to introduction of the sulfur trioxide, thus preventing conversion of excessive amounts of sulfur trioxide to sulfuric acid. Any suitable method may be used to dry the reactor surfaces such as air drying, radiant heating, and the like. Preferably the water dew point inside the reactor to be treated is maintained at a value of 20° C. or below.

The sulfur trioxide may be introduced into the reactor interior by any method which permits such material to substantially, uniformly contact the interior reactor surfaces. A preferred method involves charging a closed, evacuated reactor with a measured amount of sulfur trioxide delivered through a reactor port. This approach allows a fixed amount of sulfur trioxide to be used and has the additional advantage in that treatment occurs in a closed system, thereby minimizing potential for human contact. The amount of sulfur trioxide applied to the interior reactor surfaces is not critical so long as at least about 0.01 grams of sulfur trioxide per gallon of reactor volume, preferably from about 0.05 to about 15 grams per gallon, is introduced. The amounts of sulfur trioxide required for optimum effectiveness will depend upon reactor size (surface to volume ratio) and water dew point of the atmosphere inside the reactor. Reactors having a water dew point in excess of 20° C. may also be treated in the manner prescribed by the present invention, but require the introduction of larger amounts of sulfur trioxide.

The time and temperature of contact of the sulfur trioxide can vary over wide limits. Normally the sulfur trioxide is maintained in contact with the reactor surfaces for a time within the range of from about 1 minute to about 2 hours. Furthermore, it is desirable to maintain the interior reactor surfaces during treatment with sulfur trioxide at a temperature at which the sulfur trioxide is in the gaseous state, and preferably between about 25° C. and about 100° C.

Following the introduction of gaseous sulfur trioxide, the interior surfaces of the reactor are beneficially flushed with water. Such procedure tends to remove any oily sulfuric acid which may be present and thus prevent the formation of undesirable corrosion of the reactor surfaces.

The treated reactor surfaces may also be neutralized if desired before proceeding with additional polymerization reactions. Neutralization may be accomplished through utilization of basic compounds such as ammonia, sodium carbonate, sodium hydroxide, potassium hydroxide, lithium hydroxide, calcium hydroxide, ammonium hydroxide, and sodium bicarbonate. These compounds can be introduced into the rinse water before or during contact with the reactor surfaces. Preferably, sufficient compound is added to bring the pH of the rinse water up to at least about 8.

EXAMPLE

The present invention was utilized in connection with a 4,000 gallon, stainless steel polymerization reactor. A styrene-0.04 weight percent divinyl benzene copolymer bead was made in this reactor by suspension polymerization. The suspension was stabilized with an organic suspension agent. After two polymerization runs, the reactor was opened and cleaned by water lance until the bulk of the adhering polymer buildup was removed. The reactor was then dried by maintaining the reactor walls at 100° C. and circulating air throughout the reactor. The dried reactor was evacuated to about 8 inches of mercury and a container of sulfur trioxide connected to the reactor. By warming the sulfur trioxide to about 80° C. and opening it into the reactor vacuum, the sulfur trioxide was vaporized and transferred into the reactor. About 10 pounds of sulfur trioxide (about 1.1 grams per gallon of reactor) was vaporized into the reactor volume and maintained in contact with the reactor internal surfaces for about one hour. At the end of the hour the reactor was filled with water by means of internal sprays. The sulfur trioxide was dissolved in the water and neutralized with sodium bicarbonate to a pH of 8.5. This neutralized rinse was held in contact with the reactor internal surfaces with agitation for about one hour. After the solution was removed, the reactor was sprayed down with fresh water and the reactor placed on line for further polymerization. The reactor was then used for four suspension polymerization runs with only a low pressure water flush applied between each run. The reactor was inspected after the four runs and essentially no polymer buildup was observed. A companion reactor which had gone through the same procedure as noted above, except no sulfur trioxide contact or accompanying rinse, had extensive polymer buildup after only two polymerization runs.

Similar runs were conducted in the suspension polymerization reactor using about 20 pounds of sulfur trioxide in contact with the reactor surfaces for about 30 minutes at about 60° C. with substantially the same result—essentially no polymer build-up after four runs. When polymer build-up did occur, the polymer was easier to remove from the reactor surfaces than polymer adhering to untreated reactor surfaces.

In the same manner, the present invention can be utilized to reduce polymer buildup in reactors carrying out suspension polymerization of other monovinyl aromatic polymers, including styrene-acrylonitrile-divinyl benzene polymers.

What is claimed is:

1. In suspension polymerization of monovinyl aromatic polymers in a reactor wherein polymer buildup occurs on the internal surfaces of the reactor, the improvement which comprises contacting the internal surfaces of the reactor with at least about 0.01 gram of sulfur trioxide per gallon of reactor volume prior to said suspension polymerization, whereby further polymer buildup is retarded.

2. The method of claim 1 wherein the sulfur trioxide is in the gaseous state.

3. The improvement of claim 1 including the additional step of rinsing the internal surfaces of the reactor with water following contact with the sulfur trioxide.

4. The improvement of claim 3 wherein the water rinse contains a neutralizing agent.

5. The improvement of claim 1 wherein the monovinyl aromatic polymer is a monovinyl aromatic-polyvinyl aromatic copolymer containing from about 0.01 to about 0.5 weight percent polyvinyl aromatic compound.

6. The improvement of claim 5 wherein the copolymer is a styrene-divinyl benzene copolymer.

7. The improvement of claim 6 wherein the styrene-divinyl benzene copolymer also contains acrylonitrile.

* * * * *